United States Patent
Pasca et al.

(10) Patent No.: US 8,521,739 B1
(45) Date of Patent: Aug. 27, 2013

(54) CREATION OF INFERRED QUERIES FOR USE AS QUERY SUGGESTIONS

(75) Inventors: Alexandru Marius Pasca, Sunnyvale, CA (US); Lev Finkelstein, Netanya (IL)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/306,377

(22) Filed: Nov. 29, 2011

Related U.S. Application Data

(60) Provisional application No. 61/550,188, filed on Oct. 21, 2011.

(51) Int. Cl.
*G06F 17/30* (2006.01)

(52) U.S. Cl.
USPC ............ 707/736; 707/758; 707/769; 707/775

(58) Field of Classification Search
USPC ................ 707/692, 706, 721–723, 748, 767, 707/802, 736, 758, 769, 775
See application file for complete search history.

(56) References Cited

U.S. PATENT DOCUMENTS

| | | | |
|---|---|---|---|
| 6,411,950 B1 * | 6/2002 | Moricz et al. ......................... | 1/1 |
| 7,809,745 B2 * | 10/2010 | Elango et al. ................. | 707/765 |
| 2010/0299343 A1 * | 11/2010 | Ahari et al. .................... | 707/759 |
| 2011/0320470 A1 * | 12/2011 | Williams et al. .............. | 707/767 |

OTHER PUBLICATIONS

Tim Paek, Designing pharase builder: a mobile real-time query expansion interface, MobileHCI'09, Sep. 15-18, 2009, Bonn, Germany. ACM 978-1-60558-281-8.*

* cited by examiner

*Primary Examiner* — Usmaan Saeed
*Assistant Examiner* — Cecile Vo
(74) *Attorney, Agent, or Firm* — Middleton Reutlinger

(57) ABSTRACT

Technology is described herein for creating new, inferred queries that are suitable for use as query suggestions. The technology includes mapping different past queries that represent different information requests, but that share a number of terms having the same or similar form. An inferred query is created by replacing unshared terms in one mapped query with the unshared terms in another mapped query, based on the similarity between the unshared terms in the two mapped queries. The inferred query thus represents a new information request that is derived from the information requests of the past queries used to form it. The inferred query can then be provided as a query suggestion, which increases the likelihood of providing query suggestions that will assist users in finding the information they seek. In doing so, meaningful query suggestions can be provided to users seeking information outside the coverage of the past queries.

30 Claims, 7 Drawing Sheets

Examples of Inferred Queries

| Inferred Query | Via Query Template |
|---|---|
| "audio quality of ipod touch 3g" | "* of ipod touch 3g" |
| "dress code of albert hall" | "dress code at *" |
| "fly from paris to zagreb" | "fly from paris to *" |
| "formatting decimal to string in c" | "* decimal to string in c" |
| "how is the weather in key west in august" | "how is the weather in * in august" |
| "how to replace battery on imac" | "how to replace battery on *" |
| "max speed of corvette zr1" | "* of corvette zr1" |
| "pet supply stores in milwaukee" | "* stores in milwaukee" |
| "what is the national flag of france" | "what is the * of france" |
| "when did reese witherspoon win the oscar" | "when did * win the oscar" |
| "where to buy t mobile phones without contract" | "where to buy * phones without contract" |
| ... | ... |

Fig. 5

CREATION OF INFERRED QUERIES FOR USE AS QUERY SUGGESTIONS

CROSS-REFERENCE TO RELATED APPLICATIONS

This application claims the benefit of U.S. Provisional Application No. 61/550,188 entitled "Creation of Inferred Queries for use as Query Suggestions", filed 21 Oct. 2011, which is incorporated by reference herein.

BACKGROUND

The present disclosure relates to query processing. In particular, it relates to creating useful search query suggestions.

Information retrieval systems, such as Internet search engines, help users by retrieving information, such as web pages, images, text documents and multimedia content, in response to queries. Search engines use a variety of signals to determine the relevance of the retrieved content to the user's query.

Formulating a query that accurately represents the user's informational need can be challenging. Search engines may suggest queries to the user, to help the user. Some search engines provide query suggestions to the user as the user is typing a query, essentially completing the query by typing ahead for the user.

The queries suggested by the search engine often are taken from past user queries. However, as new and updated documents are made available, thereby increasing the breadth of accessible information, the information coverage represented by the past user queries can quickly become stale and out-of-date. For example, an ever-growing document collection such as the World Wide Web may include accessible information that has not been previously requested via the past user queries. As a result, a user seeking information outside the coverage of the past user queries, may not be provided with useful query suggestions. This can frustrate the user and result in a poor user experience.

SUMMARY

In one implementation, a method is described that includes determining prefixes, infixes and postfixes of unique queries in a log of past queries submitted to one or more search engines. An infix of a particular unique query is a sequence of one or more terms occurring between a prefix at a beginning of the particular unique query and a postfix at an end of the particular query. A plurality of groups of queries are then identified. The queries in each group have matching prefixes, matching postfixes and different infixes. For each of queries a respective query template is then created by selecting the matched prefix and the matched postfix of the queries in the group. The query templates are then reformulated into corresponding canonical representations using canonicalization rules. A first group of queries are then identified that has a query template canonical representation matching that of a second group of queries. Infixes of one or more queries in the first group are then selected. The infixes are selected based at least in part on similarity between terms in the infixes of the queries in the first group and terms in the infixes of the queries in the second group. One or more inferred queries are then created by adding the selected infixes to the query template of the second group of queries. The inferred queries are then stored for use as query suggestions.

This method and other implementations of the technology disclosed can each optionally include one or more of the following features.

The prefixes, infixes and postfixes can be determined by forming a plurality of query term triples for the particular unique query. Each of the query term triples can contain different term groupings of a prefix, a non-empty infix, and a postfix of terms in the particular unique query. This method can be further extended by identifying multiple groups of queries that include the particular unique query.

One or more of the prefix and the postfix of the particular unique query can be empty.

The canonicalization rules can include stemming of terms in the query templates. The canonicalization rules can include arranging canonical forms of the terms in the query templates based on a predefined order.

Selecting the infixes of queries in the first group can include creating a list of candidate phrases based on similarity between the infixes of the queries in the second group and the candidate phrases. Only the infixes of queries in the first group which appear in the list of candidate phrases may then be selected for the list.

Creating the list of candidate phrases can include calculating similarity scores between candidate phrases in the list and the infixes of the queries in the second group. The candidate phrases can then be sorted using the similarity scores to create a ranking. Candidate phrases to include in the list can be selected based at least in part on the ranking. This method can be further extended by selecting candidate phrases having similarity scores above a threshold.

Creating each of the inferred queries can include adding one of the selected infixes between the matched prefix and the matched postfix of the query template of the second group of queries.

The method can further include receiving a query. One or more of the inferred queries can then be selected as query suggestions for the received query. The selected one or more inferred queries can then be sent in response to receiving the query.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular implementations of the subject matter described herein process past queries to create new, inferred queries for use as meaningful query suggestions. These inferred queries represent new information requests that are derived from the information requests of the past queries used to form them. These inferred queries allow additional query suggestions to be provided, which increases the likelihood of providing query suggestions that will assist users in finding the information they seek. In doing so, meaningful query suggestions can be provided to users seeking information outside the coverage of the past queries.

Particular aspects of one or more implementations of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIG. 5 illustrates an example of inferred queries and the query templates used to create them.

DETAILED DESCRIPTION

Figure 1:
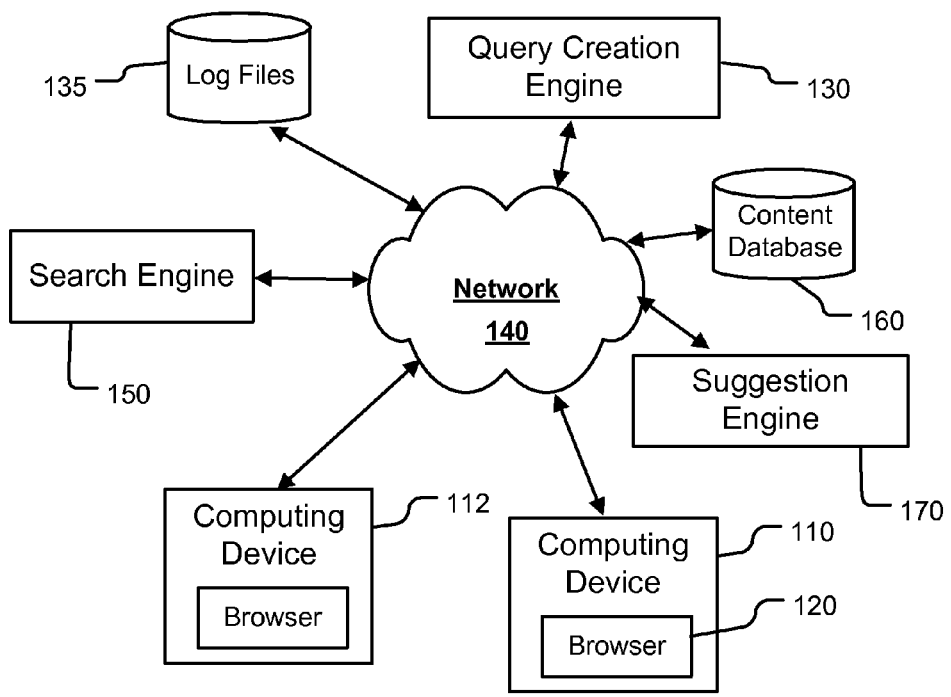
FIG. 1 illustrates a block diagram of an example environment in which generating inferred queries suitable for use as query suggestions can be used.

Technology is described herein for creating new, inferred queries that are suitable for use as query suggestions. The technology includes mapping past queries that have different query formulations representing different information requests, but that share a number of terms having the same or similar form. An inferred query can then be created by replacing unshared terms in one mapped query with the unshared terms in another mapped query, based on the similarity between the unshared terms in the two mapped queries.

The inferred query thus represents a new information request that is derived from the information requests of the past queries used to form it. The inferred query can then be provided as a query suggestion to subsequent users, which increases the likelihood of providing query suggestions that will assist users in finding the information they seek. In doing so, useful query suggestions can be provided to users seeking information outside the coverage of the past queries.

The technology includes analyzing a log of past queries submitted to one or more search engines to retrieve unique past queries. A unique query is a query that is not identical to another query.

A prefix, a non-empty infix, and a postfix for each of the unique queries are then determined. The prefix is a sequence of terms occurring at the beginning of a query. The postfix is a sequence of terms occurring at the end of a query. The infix is a sequence of one or more terms occurring between the last term in the prefix and the first term in the postfix. In some implementations, a prefix or a postfix may be empty (i.e. containing no query terms). In such a case, if the prefix is empty, then the infix begins with the first term in the query. Similarly, if the postfix is empty, then the infix ends with the last term in the query.

The prefixes and postfixes of the queries are then compared to identify groups of queries. The queries in a group have matching prefixes, matching postfixes, and different infixes.

As an example, the query "lyrics of yesterday beatles" may have a prefix, infix and postfix of {lyrics of, yesterday, beatles}. The query "lyrics of hey jude beatles" may have a prefix, infix and postfix of {lyrics of, hey jude, beatles}. These two queries have matching prefixes (i.e., 'lyrics of'), matching postfixes (i.e. 'beatles'), and different infixes (i.e. 'yesterday' versus 'hey jude'). In such a case, the two queries "lyrics of yesterday beatles" and "lyrics of hey jude beatles" would be included in the same group.

Query templates are then created for the corresponding groups of queries. A query template is created based on the matched prefix and the matched postfix of the queries in the corresponding group. A given query template thus represents a generalization of the queries in the corresponding group of queries.

As described in more detail below, the query template is used as the basis of creating new, inferred queries whose form resembles that of the queries in the corresponding group, but that represent new information requests.

A variety of different techniques can be used to create the query templates. For example, the creation of the query template can include selecting the matched prefix and the matched postfix of the queries in the corresponding group, and replacing the different infixes with a wildcard '*'. As an example, a group of queries "lyrics of come together beatles", "lyrics of hey jude beatles", and "lyrics of yesterday beatles" may be represented by the query template "lyrics of * beatles".

The query templates for respective groups of queries can then be reformulated into corresponding canonical representations using canonicalization rules. The canonicalization of the query templates enables the mapping of queries in different groups that represent different information requests, but that share a number of terms having the same or similar form. For example, the mapped queries in different groups may both take the form of precise natural language queries. As another example, the mapped queries in different groups having may both take the form of keyword-based queries.

The canonical representations of the query templates are then compared to identify one or more other groups of queries that have query template canonical representations matching that of a given group.

Infixes of the queries in the identified other groups of queries are then selected. The selection of the infixes of the queries within the identified other groups is based at least in part on the similarity of terms in the selected infixes of the queries in the identified groups and the infixes of the queries in the given group. A variety of different techniques can be used to select the infixes.

One or more inferred queries are then created by adding the selected infixes to the query template of the given group of queries, by replacing the wildcard '*' in the query template with the selected infixes.

The inferred queries are then stored for use as query suggestions. The inferred queries may, for example, be stored in the form of a query list or other type of data structure. The inferred queries can then be chosen and provided as query suggestions to users.

As a result of the use of the query template, the form of the inferred queries automatically resembles that of the past queries in the corresponding group, whether key-word based or expressed in natural language. In addition, the matching of canonical representations of query templates allows the added terms in an inferred query to agree syntactically with the remainder of the inferred query. As a result, the inferred queries can be utilized as query suggestions which represent new and useful information requests.

FIG. 1 illustrates a block diagram of an example environment 100 in which creating infrequent queries suitable for use as query suggestions can be used. The environment 100 includes client computing devices 110, 112 and a search engine 150. The environment also includes a communication network 140 that allows for communication between various components of the environment 100.

During operation, users interact with the search engine 150 through the client computing devices 110, 112. The client computing devices 110, 112 and the search engine 150 each include memory for storage of data and software applications, a processor for accessing data and executing applications, and components that facilitate communication over the communication network 140. The computing devices 110, 112 execute applications, such as web browsers (e.g. web browser 120 executing on computing device 110), that allow users to formulate complete queries and submit them to the search engine 150. The search engine 150 receives queries from the computing devices 110, 112, and executes the queries against a content database 160 of available documents such as web pages, images, text documents and multimedia content. The search engine 150 identifies content which matches the queries, and responds by generating search results which are transmitted to the computing devices 110, 112 in a form that can be presented to the users. For example, in response to a query from the computing device 110, the search engine 150 may transmit a search results web page to be displayed in the web browser 120 executing on the computing device 110.

The search engine 150 maintains log files 135 of past queries submitted to the search engine 150 by prior users during prior query sessions. The log files 135 may be collective stored on one or more computers and/or storage devices. The search engine 150 may maintain an anonymous log of queries, not traceable to a particular user.

The environment 100 also includes a query creation engine 130. The log files 135 are processed by the query creation engine 130 to create inferred queries that are suitable for use as query suggestions using the techniques described herein. The query creation engine 130 can be implemented in hardware, firmware, or software running on hardware. The query creation engine 130 is described in more detail below with reference to FIGS. 2-9.

The applications executing on the client computing devices 110, 112 also provide partial queries being formulated by users, before the users have indicated completion of the queries. The applications may be for example a web browser, a toolbar running in a web browser, or a search client running on the client computing devices 110, 112. In some implementations, the applications provide each character of a query as it is typed or otherwise entered by the users. In other implementations, the applications provide multiple characters at a time following a pause between character entries.

A "partial query" is a query formulated by a user prior to an indication by the user that the query is complete. A user may indicate completion of the query by entering a carriage return or equivalent character. As another example, the user may indicate completion of the query by entering a carriage return or equivalent character. As another example, the user may indicate completion of the query by selecting a search button in a user interface presented to the user during entry of the query. As yet another example, the user may indicate completion of the query by saying a command in a speech interface or pausing more than a predetermined period of time.

In response to a partial query, the search engine 150 forwards the partial query to a suggestion engine 170. The suggestion engine 170 includes memory for storage of data and software applications, a processor for accessing data and executing applications, and components that facilitate communication over the communication network 140. The suggestion engine 170 may then match the partial query to one or more of the inferred queries to select query suggestions for the user's query. The suggestion engine 170 may use conventional or other techniques to determine one or more of the inferred queries that are appropriate match to of the partial query. For example, the suggestion engine 170 may use prefix based matching. The suggestion engine 170 then provides these query suggestions to the user.

These query suggestions provided by the suggestion engine 170 represent queries that the users may want to submit in addition to or instead of the partial queries actually being typed. The query suggestions may for example be displayed within a cascaded drop down menu of the search field of an application, such as a web browser, executing on the user's computing device as the user is typing the query. In some implementations, search results for a query suggestion within the cascaded drop down menu are also displayed as the user is typing the query.

The search engine 150 may also forward complete queries to the suggestion engine 170. The suggestion engine 170 may then match the complete query to one or more of the inferred queries to select query suggestions for the user's query. The suggestion engine 170 then provide these query suggestions to the user. The query suggestions may, for example, be embedded within a search results web page to be displayed in an application, such as a web browser, executing on the user's computing device.

The network 140 facilitates communication between the various components in the environment 100. In one implementation, the network 140 includes the Internet. The network 140 can also utilize dedicated or private communication links that are not necessarily part of the Internet. In one implementation, the network 140 uses standard communications technologies, protocols, and/or inter-process communication techniques.

Many other configurations are possible having more or less components than the environment 100 shown in FIG. 1. For example, the environment 100 can include multiple search engines. The environment 100 can also include may more computing devices that submit queries.

Figure 2:
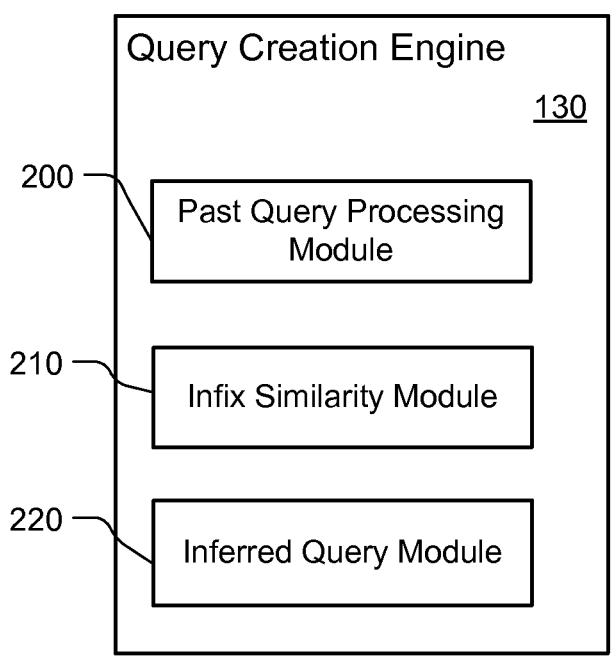
FIG. 2 is a block diagram illustrating example modules within the query creation engine.

FIG. 2 is a block diagram illustrating example modules within the query creation engine 130. In FIG. 2, the query creation engine 130 includes a past query processing 200, an infix similarity module 210 and an inferred query module 220. Some implementations may have different and/or additional modules than those shown in FIG. 2. Moreover, the functionalities can be distributed among the modules in a different manner than described herein.

The past query processing module 200 analyzes the log files 135 to retrieve unique past queries that have been submitted by prior users. A unique query is a query that is different from the other past queries. In some implementations, each unique query is retrieved from the log files 135 only once. In other implementations, the same query may be retrieved multiple times, and duplicate queries may be filtered out.

In some implementations, past queries that do not appear more than a threshold number of times in the log may be filtered out from the group of unique past queries.

The past query processing module 200 then determines a prefix, a non-empty infix, and a postfix for each of the unique queries. The prefix is a sequence of terms occurring at the beginning of a query. The postfix is a sequence of terms occurring at the end of a query. The infix is a sequence of one or more terms occurring between the last term in the prefix and the first term in the postfix. In some implementations, a prefix or a postfix may be empty (i.e. containing no query terms). In such a case, if the prefix is empty, then the infix begins with the first term in the query. Similarly, if the postfix is empty, then the infix ends with the last term in the query.

The individual terms in a query may for example be identified based on term boundaries. A term boundary is one or more characters in the query used to indicate that one term has ended and another term is beginning. A term boundary can be for example a white space. In some implementations, punctuation may be considered a term boundary.

A variety of different techniques can be used to determine how to divide the terms of a query in order to determine where the prefix ends and where the postfix begins. In some implementations, the prefix is a first predetermined number of terms at the beginning of the query, the postfix is a second predetermined number of terms at the end of the query, and the infix is the sequence of terms occurring between the last term in the prefix and the first term in the postfix.

In other implementations, the terms in a given query are divided to form multiple query term triples, where each triple contains different term groupings of a prefix, non-empty infix, and postfix of terms occurring in the given query.

In some implementations, the individual terms within a query are split into all possible groupings of query term triples of a prefix, non-empty infix and postfix. In instances in which the given query includes a large number of terms, the number of triples that are formed may be limited to a predetermined maximum number. A threshold may also be imposed on the maximum number of terms allowed in an infix.

As an example, multiple query term triples of {prefix, infix, postfix} for the query "lyrics of hey jude beatles" may include {lyrics, of hey jude, beatles}, {lyrics of, hey jude, beatles}, {lyrics of, hey jude, beatles}, etc.

The past query processing module 200 then compares the prefixes and postfixes of the queries to identify groups of queries. The queries in a group have matching prefixes, matching postfixes, and different infixes. A given query that has been divided to form multiple query term triples, may be included within multiple groups.

In some implementations, this matching may be carried out by exact matching of prefix strings and exact matching of the postfix strings for the corresponding unique queries. In other implementations, the decision to include two queries in the same group could be based on soft matching of the prefixes and postfixes respectively. For example, the prefixes and postfixes could be stemmed and their stop words removed, before matching.

As an example, a query "lyrics of yesterday beatles" may be divided to form a prefix, infix and postfix of {lyrics of, yesterday, beatles}. The query "lyrics of hey jude beatles" may be divided into {lyrics of, hey jude, beatles}. These two queries having matching prefixes (i.e., 'lyrics of') matching postfixes (i.e. 'beatles'), and different infixes (i.e. 'yesterday' versus 'hey jude'). In such a case, the two queries "lyrics of yesterday beatles" and "lyrics of hey jude beatles" would be included in the same group.

The past query processing module 200 then forms query templates for corresponding groups of queries. A given query template represents a generalization of the queries in the corresponding group of queries. As described in more detail below, the template is used as a basis for forming new, inferred queries whose form resembles that of the queries in the corresponding group, but which represent new information requests.

The query template is formed by selecting the matched prefix and the matched postfix of the queries in the corresponding group, and replacing the different infixes with a wildcard '*'. As an example, a group of queries "lyrics of come together beatles", "lyrics of hey jude beatles", and "lyrics of yesterday beatles" may be represented by the query template "lyrics of * beatles". A query may contribute to the creation of multiple query templates, via different infixes. For example, another template created from the query "lyrics of yesterday beatles" may be "lyrics of yesterday *".

The past query processing module 210 then reformulates the query templates into canonical representations using canonicalization rules. The canonicalization rules enable the mapping of different groups of queries that have different formulations and represent different information requests, but that share a number of terms having the same or similar form. For example, different groups of queries having matching query template canonical representations may both have the form of precise natural language queries. As described in more detail below, this canonical matching enables the replacement of infixes of queries in one group with similar infixes of queries in another group to create inferred queries that represent accessible information that has not been previously requested via the past queries.

Canonicalization can include the process of converting the terms in a query template into a standard form by replacing the terms with their canonical forms when the terms meet certain criteria.

In some implementations, the canonicalization rules include stemming of terms in the query templates. Stemming is the process of reducing various grammatical forms of a term to a common root form, which may or may not be a valid word. Stemming can include the removal and/or replacement of characters in the term. For example, stemming can include replacing plural nouns with corresponding singular nouns. Thus, 'lyrics' can be stemmed to 'lyric', and 'beatles' can be stemmed to 'lyric'.

In some implementations, the canonicalization rules include the removal of terms in the query templates that are stop words. Stop words include words that are common. The stop words can include articles such as "a", "an," "and," and "the". The stop words can include prepositions such as "of," "to" and "for". The stop words can include auxiliary verbs such as "have" and "were". The stop words can also include typical initial words in questions such as "who", "how" and "where".

In some implementations, the canonicalization rules include arranging canonical forms of terms in the query templates based on a predefined order. For example, the canonical forms of terms in the query templates may be arranged in alphabetical order. Identical terms in a given query template may be removed in some implementations. Other canonicalization rules can also be used.

The past query processing module 200 then compares the query template canonical representations of the groups of queries. For a given group of queries, the past query processing module 200 identifies one or more other groups of queries that have query template canonical representations matching that of the given group. The number of groups of queries that have the same query template canonical representation can vary from implementation to implementation.

In some implementations, the matching is carried out by exact matching of the canonical representation strings. In other implementations, the matching may be carried by soft matching of the strings. The soft matching may for example be carried out by calculating an edit distance of the strings and comparing that to a threshold.

As an example, each of the query templates "lyrics of * beatles", "lyrics the beatles *", "beatles lyrics *", "lyrics for * by the beatles", "* by beatles lyrics", and "lyrics * by the beatles" may have the same canonical representation, "* beatle lyric".

For the given group of queries, the infix similarity module 210 then selects infixes of queries within the identified other groups of queries. The selection of the infixes of the queries within the identified other groups is based at least in part on the similarity of terms in the selected infixes of the queries in the other groups and the infixes of the queries in the given group.

The techniques for determining the similarity between the infixes of the queries within the identified other groups and the infixes of the queries in the given group can vary from implementation to implementation. For example, the similarity between two infixes may be calculated by computing the semantic distance, or length of path along Is-A edges, between the two phrases in an external resource such as WordNet.

In some implementations, the infix similarity module 210 obtains a list of distributionally similar candidate phrases and their corresponding distributional similarity score for the different infixes of the queries in the given group. These distributionally similar candidate phrases are phrases that have similar meanings to one or more infixes of the queries in the given group. In general, the infix similarity module 210 may obtain the distributionally similar candidate phrases using conventional or other techniques.

Phrases that typically occur in similar contexts may for example be considered to have similar meanings For example, a particular phrase that co-occurs with the same words as that of another phrase over a collection of documents, such as html web pages, may be considered to be distributionally similar phrases.

As another example, the contexts may be approximated via linguistic dependencies detected with noun chucking and syntactic parsing. A phrase may be represented as a vector of contextual features, where a feature is a token collected from windows of three tokens centered around the phrase in sentences across a collection of documents such as web pages. In the contextual vector of a phrase P, the weight of a feature F can be calculated as the pointwise-mutual information (PMI) between the phrase P and feature F using the following equation:

$$PMI(P, F) = \log\left(\frac{Freq(P, F)}{Freq(P) * Freq(F)}\right)$$

where Freq(P,F) is the frequency of the feature F occurring with the phrase P, and N is the feature vocabulary size. The distributional similarity score between two phrases can then be calculated as the cosine similarity between contextual vectors of the two phrases. Alternatively, the distributional similarity score may for example be calculated using Jaccard or Dice coefficients.

The infix similarity module 210 may then compute similarity scores for each of the candidate phrases, relative to the entire group of infixes of the queries in the given group. In one implementation, the infix similarity module 210 calculates the similarity scores using the following equation:

$$Sim(U, T) = \frac{\sum_{i=1}^{N} DScore(U, K_i)}{N}$$

where Sim(U,T) is the similarity score for a particular candidate phrase U in the list of candidate phrases for the query template T of the given group of queries, DScore(U,K$_i$) is the distributional score of the particular candidate phrase U for each of the (N) different infixes K of the queries in the given group.

In some implementations, the candidate phrases can be sorted using the similarity scores to create a ranking, and one or more of the candidate phrases can then be selected based on the ranking For example, a predetermined number of the highest ranked candidate phrases may be selected.

Alternatively, other criteria may be used. For example, the similarity scores of the candidate phrases may be compared to a threshold, and the ones that satisfy the threshold may be selected.

The selected candidate phrases may be further filtered, by retaining only the candidate phrases that occur within infixes of the queries within the identified other groups of queries for the given group. These filtered candidate phrases can then be selected as the final selected infixes of the queries within the identified other groups of queries for use in creating new inferred queries.

As an example, the unfiltered list of candidate phrases for the query template "lyrics of * beatles" may contain, among other phrases, "something", "earlier today", "last friday", "gather together", "elenor rigby", "two weeks ago", "lucy in the sky with diamonds", "strawberry fields forever", "something else", "here comes the sun", and "lovely rita". In this example, out of these phrases, "something", "earlier today", "last friday", "gather together", "two weeks ago" and "something else" are not among the infixes of the queries within the other groups of queries having the same query template canonical representation as that of the query template "lyrics of * beatles". Therefore, these phrases are discarded from the list of candidate phrases for the query template "lyrics of * beatles". In contrast, in this example, the query templates "lyrics of * beatles" and "beatles lyrics *" have, among their infixes, the candidate phrases "elenor rigby" and "lucy in the sky with diamonds"; and "here comes the sun" and "lovely rita" respectively. Therefore, these phrases are retained as selected infixes for the query template "lyrics of * beatles" after filtering.

The inferred query module 220 then creates one or more inferred queries by adding the selected infixes to the query template of the given group of queries. Each of the selected infixes is then used to create a corresponding new inferred query. An inferred query is created by adding one of the selected infixes to the query template of the given group, by replacing the wildcard '*' in the query template with the selected infixes.

Continuing the example from above, the inferred queries created using the query template "lyrics of * beatles" include the queries "lyrics of elenor rigby beatles", "lyrics of lucy in the sky with diamonds beatles", "lyrics of here comes the sun beatles", and "lyrics of lovely rita beatles".

The inferred queries are then stored for use as query suggestions. The inferred queries may, for example, be stored in the form of a query list or another type of data structure maintained by the inferred query module 220. The inferred queries can then be chosen by the suggestion engine 170 to provide as query suggestions to users.

Figure 3:
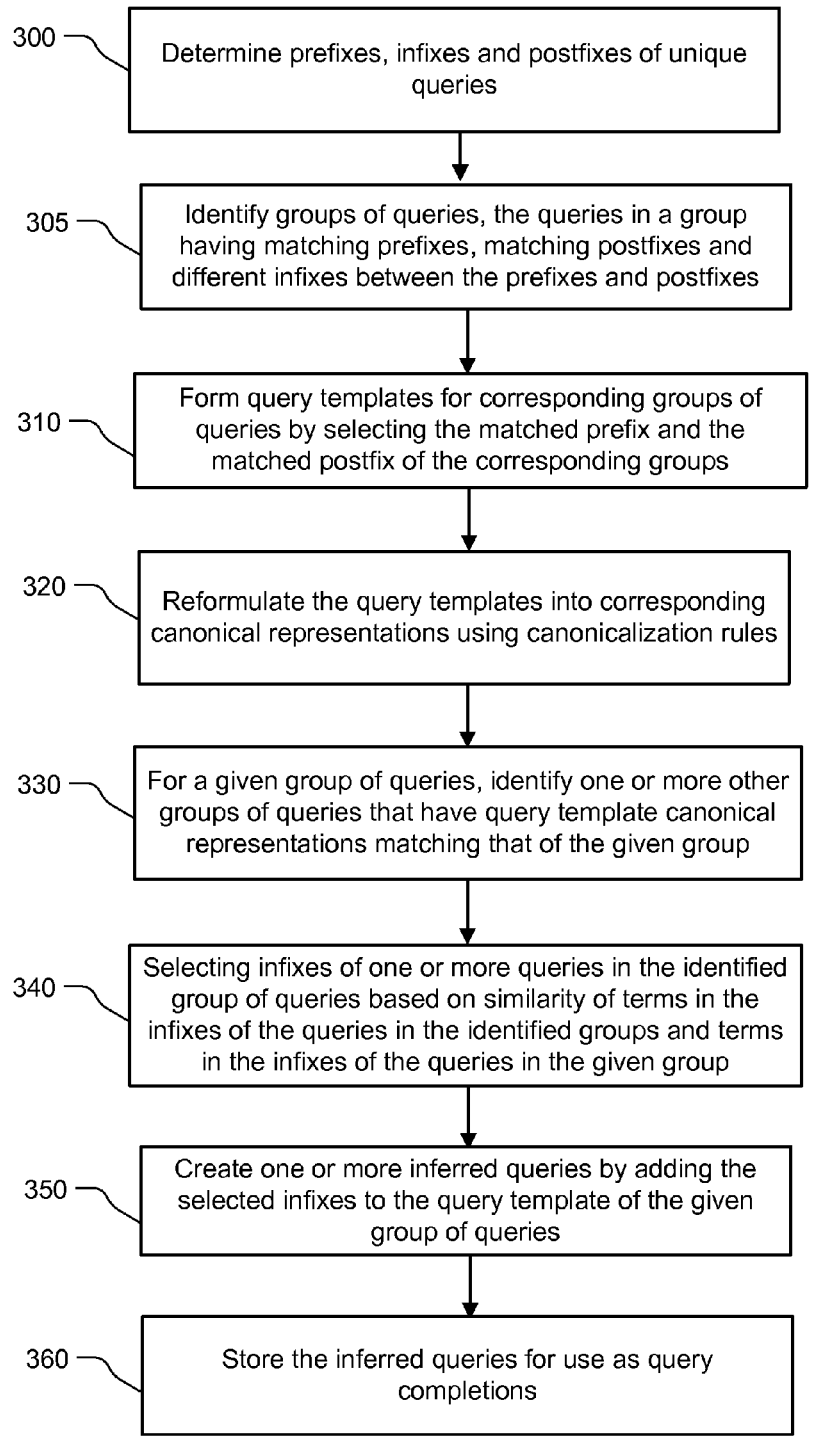
FIG. 3 is a flow chart illustrating an example process for creating inferred queries suitable for use as query suggestions.

FIG. 3 is a flow chart illustrating an example process for creating inferred queries suitable for use as query suggestions. Other embodiments may perform the steps in different orders and/or perform different or additional steps than the ones illustrated in FIG. 3. For convenience, FIG. 3 will be described with reference to a system of one or more computers that performs the process. The system can be, for example, the query creation engine 130 described above with reference to FIG. 1.

At step 300, the system determines prefixes, infixes, and postfixes of unique queries in the log files 135. At step 305, the system identifies groups of queries. The queries in a group have matching prefixes, matching postfixes, and different infixes.

At step 310, the system forms query templates for corresponding groups of queries. The query template is formed by selecting the matched prefix and the matched postfix of the queries in the corresponding group, and replacing the different infixes with a wildcard '*'.

At step 320, the system reformulates the query templates into canonical representations using canonicalization rules.

At step 330, for a given group of queries, the system identifies one or more other groups of queries that have query template canonical representations matching that of the given group.

At step 340, the system selects infixes of one or more queries in the identified group of queries. The infixes are selected based on similarity of terms in the infixes of the queries in the identified groups and terms in the infixes of the queries in the given group.

At step 350, the system creates one or more inferred queries by adding the selected infixes to the query template of the given group of queries. At step 360, the system stores the inferred queries for use as query completions.

Figure 4:
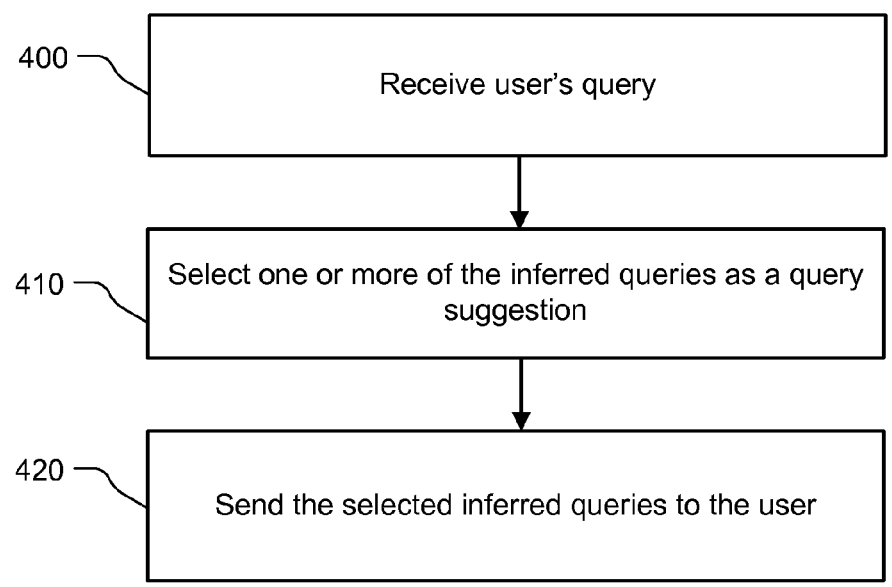
FIG. 4 is a flow chart illustrating an example process for providing an inferred query as a query suggestion.

FIG. 4 is a flow chart illustrating an example process for providing an inferred query as a query suggestion. Other embodiments may perform the steps in different orders and/or perform different or additional steps than the ones illustrated in FIG. 4. For convenience, FIG. 4 will be described with reference to a system of one or more computers that performs the process. The system can be, for example, the suggestion engine 170 described above with reference to FIG. 1.

At step 400, the system receives a user's query. The user's query may be a partial query or a complete query. At step 410, the system selects inferred queries as a query suggestion for the user's query. The system may then match the user's query to one or more of the inferred queries to select query suggestions for the user's query. The system may use conventional or other techniques to determine one or more of the inferred queries that are appropriate match to the partial query. For example, the system may use prefix based matching. At step 420, the system then provides the selected inferred queries as query suggestions to the user.

FIG. 5 illustrates an example of inferred queries and the query templates used to create them. In this example, an inferred query "pet supply stores in milwaukee" was created from a past query "grocery stores in Milwaukee" by adding a selected infix "pet supply" to a query template "* stores in milwaukee". Similarly, an inferred query "what is the national flag of france" was created from a past query "what is the capital of france" by adding a selected infix "national flag" to a query template "what is the * of france".

Figure 6:
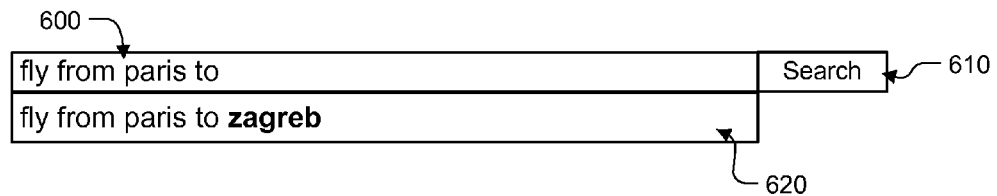
FIG. 6 is a screenshot illustrating an example environment that can be used to provide inferred queries as query suggestions to a user.

FIG. 6 is a partial screen shot illustrating an example environment that can be used to provide inferred queries as meaningful query suggestions to a user. In FIG. 6, the partial screen shot includes a search field representation 600 and a search button representation 610. In this example, while the user is entering the query "fly from paris to" into the search field representation 600, a cascaded drop down menu 620 of the search field is displayed. In this example, the drop down menu 620 includes the inferred query "fly from paris to zagreb" as a query suggestion.

Figure 7:
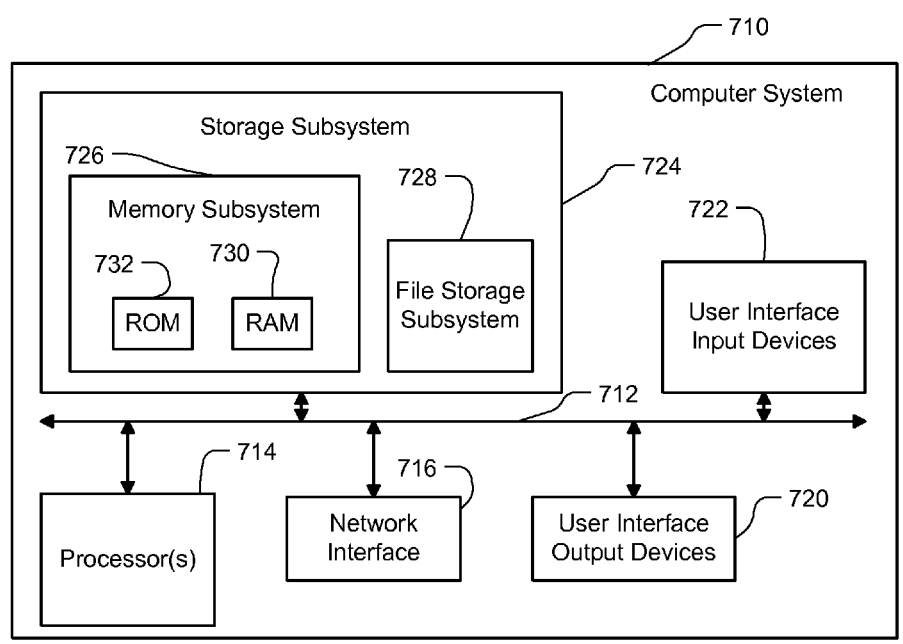
FIG. 7 is a block diagram of an example computer system.

FIG. 7 is a block diagram of an example computer system. Computer system 710 typically includes at least one processor 714 which communicates with a number of peripheral devices via bus subsystem 712. These peripheral devices may include a storage subsystem 724, comprising for example memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to communication network 140, and is coupled via communication network 140 to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 710 or onto communication network 140.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein, including the logic to create inferred queries for use as query suggestions according to the processes described herein. These software modules are generally executed by processor 714 alone or in combination with other processors.

Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating the preferred embodiments. Many other configurations of computer system 710 are possible having more or fewer components than the computer system depicted in FIG. 7.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for creating inferred queries for use as query suggestions, systems including logic and resources to create inferred queries for use as query suggestions, systems that take advantage of computer-assisted methods for creating inferred queries for use as query suggestions, media impressed with logic to create inferred queries for use as query suggestions, data streams impressed with logic to create inferred queries for use as query suggestions, or computer-accessible services that carry out computer-assisted methods for creating inferred queries for use as

We claim as follows:

1. A method comprising:
   determining prefixes, infixes and postfixes of unique queries in a log of past queries submitted to one or more search engines, wherein an infix of a particular unique query is a sequence of one or more terms occurring between a prefix at a beginning of the particular unique query and a postfix at an end of the particular query;
   identifying a plurality of groups of queries, wherein the queries in each group have matching prefixes, matching postfixes and different infixes;
   forming for each group of queries a respective query template by selecting the matched prefix and the matched postfix of the queries in the group;
   reformulating the query templates into corresponding canonical representations using canonicalization rules;
   identifying a first group of queries in the plurality of groups of queries that has a query template canonical representation matching that of a second group of queries in the plurality of groups of queries;
   identifying candidate phrases based at least in part on similarity scores between the infixes of the queries in the second group and the candidate phrases;
   selecting infixes of one or more queries in the first group of queries, wherein selecting the infixes of queries in the first group includes creating a list of the candidate phrases based on the similarity scores between the infixes of the queries in the second group and the candidate phrases, and selecting only infixes of queries in the first group which appear in the list of candidate phrases;
   creating one or more inferred queries by adding the selected infixes to the query template of the second group of queries; and
   storing the inferred queries for use as query suggestions.

2. The method of claim 1, wherein determining the prefixes, infixes and postfixes comprises forming a plurality of query term triples for the particular unique query, where each triple contains different term groupings of a prefix, a non-empty infix, and a postfix of terms in the particular unique query.

3. The method of claim 2, wherein identifying the plurality of groups of queries comprises identifying multiple groups that include the particular unique query.

4. The method of claim 1, wherein one of the prefix and the postfix of the particular unique query is empty.

5. The method of claim 1, wherein the canonicalization rules include stemming of terms in the query templates.

6. The method of claim 1, wherein the canonicalization rules include arranging canonical forms of terms in the query templates based on a predefined order.

7. The method of claim 1, wherein creating the list of candidate phrases comprises:
   calculating the similarity scores between candidate phrases in the list and the infixes of the queries in the second group;
   sorting the candidate phrases using the similarity scores to create a ranking; and
   selecting candidate phrases to include in the list based at least in part on the ranking.

8. The method of claim 7, wherein selecting the candidate phrases to include in the list comprises selecting candidate phrases having similarity scores above a threshold.

9. The method of claim 1, wherein creating each of the inferred queries comprises adding one of the selected infixes between the matched prefix and the matched postfix of the query template of the second group of queries.

10. The method of claim 1, further comprising:
    receiving a query;
    selecting one or more of the inferred queries as query suggestions for the received query; and
    sending the selected one or more inferred queries in response to receiving the query.

11. A non-transitory computer readable storage medium storing computer instructions executable by a processor to perform a method comprising:
    determining prefixes, infixes and postfixes of unique queries in a log of past queries submitted to one or more search engines, wherein an infix of a particular unique query is a sequence of one or more terms occurring between a prefix at a beginning of the particular unique query and a postfix at an end of the particular query;
    identifying a plurality of groups of queries, wherein the queries in each group have matching prefixes, matching postfixes and different infixes;
    forming for each group of queries a respective query template by selecting the matched prefix and the matched postfix of the queries in the group;
    reformulating the query templates into corresponding canonical representations using canonicalization rules;
    identifying a first group of queries in the plurality of groups of queries that has a query template canonical representation matching that of a second group of queries in the plurality of groups of queries;
    identifying candidate phrases based at least in part on similarity scores between the infixes of the queries in the second group and the candidate phrases;
    selecting infixes of one or more queries in the first group of queries, wherein selecting the infixes of queries in the first group includes creating a list of the candidate phrases based on the similarity scores between the infixes of the queries in the second group and the candidate phrases, and selecting only infixes of queries in the first group which appear in the list of candidate phrases;
    creating one or more inferred queries by adding the selected infixes to the query template of the second group of queries; and
    storing the inferred queries for use as query suggestions.

12. The non-transitory computer readable storage medium of claim 11, wherein determining the prefixes, infixes and postfixes comprises forming a plurality of query term triples for the particular unique query, where each triple contains different term groupings of a prefix, a non-empty infix, and a postfix of terms in the particular unique query.

13. The non-transitory computer readable storage medium of claim 12, wherein identifying the plurality of groups of queries comprises identifying multiple groups that include the particular unique query.

14. The non-transitory computer readable storage medium of claim 12, wherein creating each of the inferred queries comprises adding one of the selected infixes between the matched prefix and the matched postfix of the query template of the second group of queries.

15. The non-transitory computer readable storage medium of claim 12, further comprising:
    receiving a query;
    selecting one or more of the inferred queries as query suggestions for the received query; and
    sending the selected one or more inferred queries in response to receiving the query.

16. The non-transitory computer readable storage medium of claim 11, wherein one of the prefix and the postfix of the particular unique query is empty.

17. The non-transitory computer readable storage medium of claim 11, wherein the canonicalization rules include stemming of terms in the query templates.

18. The non-transitory computer readable storage medium of claim 11, wherein the canonicalization rules include arranging canonical forms of terms in the query templates based on a predefined order.

19. The non-transitory computer readable storage medium of claim 11, wherein creating the list of candidate phrases comprises:
- calculating the similarity scores between candidate phrases in the list and the infixes of the queries in the second group;
- sorting the candidate phrases using the similarity scores to create a ranking; and
- selecting candidate phrases to include in the list based at least in part on the ranking.

20. The non-transitory computer readable storage medium of claim 19, wherein selecting the candidate phrases to include in the list comprises selecting candidate phrases having similarity scores above a threshold.

21. A system including memory and one or more processors operable to execute instructions, stored in the memory, comprising instructions to:
- determine prefixes, infixes and postfixes of unique queries in a log of past queries submitted to one or more search engines, wherein an infix of a particular unique query is a sequence of one or more terms occurring between a prefix at a beginning of the particular unique query and a postfix at an end of the particular query;
- identify a plurality of groups of queries, wherein the queries in each group have matching prefixes, matching postfixes and different infixes;
- form for each group of queries a respective query template by selecting the matched prefix and the matched postfix of the queries in the group;
- reformulating the query templates into corresponding canonical representations using canonicalization rules;
- identify a first group of queries in the plurality of groups of queries that has a query template canonical representation matching that of a second group of queries in the plurality of queries;
- identify candidate phrases based at least in part on similarity scores between the infixes of the queries in the second group and the candidate phrases;
- select infixes of one or more queries in the first group of queries, wherein the instructions to select the infixes of queries in the first group include instructions to create a list of the candidate phrases based on the similarity scores between the infixes of the queries in the second group and the candidate phrases, and select only infixes of queries in the first group which appear in the list of candidate phrases;
- create one or more inferred queries by adding the selected infixes to the query template of the second group of queries; and
- store the inferred queries for use as query suggestions.

22. The system of claim 21, wherein the instructions to determine the prefixes, infixes and postfixes comprises instructions to form a plurality of query term triples for the particular unique query, where each triple contains different term groupings of a prefix, a non-empty infix, and a postfix of terms in the particular unique query.

23. The system of claim 22, wherein the instructions to identify the plurality of groups of queries comprises instructions to identify multiple groups that include the particular unique query.

24. The system of claim 21, wherein one of the prefix and the postfix of the particular unique query is empty.

25. The system of claim 21, wherein the canonicalization rules include stemming of terms in the query templates.

26. The system of claim 21, wherein the canonicalization rules include arranging canonical forms of terms in the query templates based on a predefined order.

27. The system of claim 21, wherein the instructions to create the list of candidate phrases comprises instructions to:
- calculate the similarity scores between candidate phrases in the list and the infixes of the queries in the second group;
- sort the candidate phrases using the similarity scores to create a ranking; and
- select candidate phrases to include in the list based at least in part on the ranking.

28. The system of claim 27, wherein the instructions to select the candidate phrases to include in the list comprises instructions to select candidate phrases having similarity scores above a threshold.

29. The system of claim 21, wherein the instructions to create each of the inferred queries comprises instructions to add one of the selected infixes between the matched prefix and the matched postfix of the query template of the second group of queries.

30. The system of claim 21, further comprising instructions to:
- receive a query;
- select one or more of the inferred queries as query suggestions for the received query; and
- send the selected one or more inferred queries in response to receiving the query.

* * * * *